G. A. BURNHAM.
ELECTRIC SWITCH.
APPLICATION FILED NOV. 6, 1917.

1,390,493.

Patented Sept. 13, 1921.
3 SHEETS—SHEET 1.

Inventor,
George A. Burnham
by B. J. Noyes Atty

G. A. BURNHAM.
ELECTRIC SWITCH.
APPLICATION FILED NOV. 6, 1917.
1,390,493.
Patented Sept. 13, 1921.
3 SHEETS—SHEET 2.
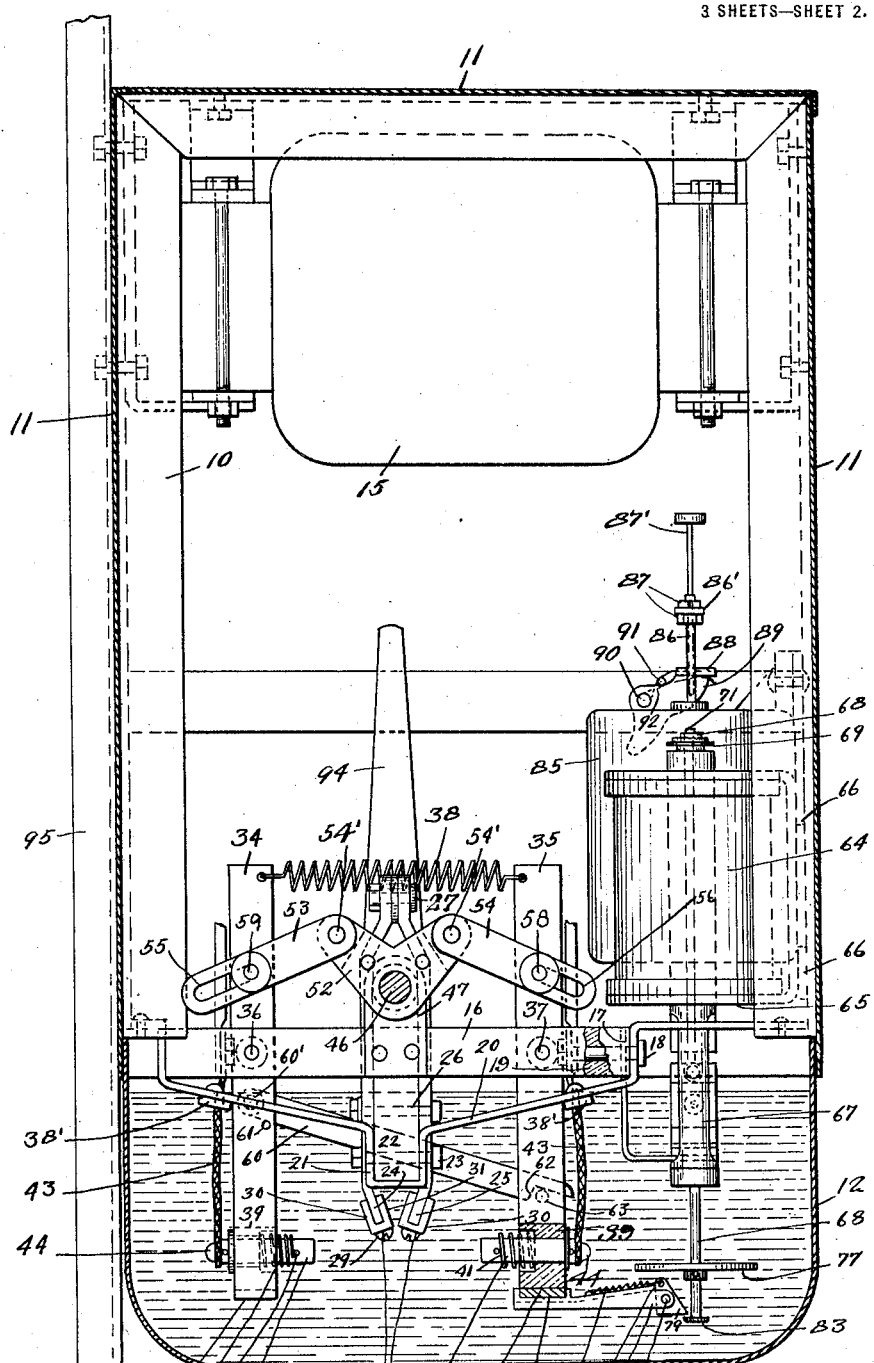

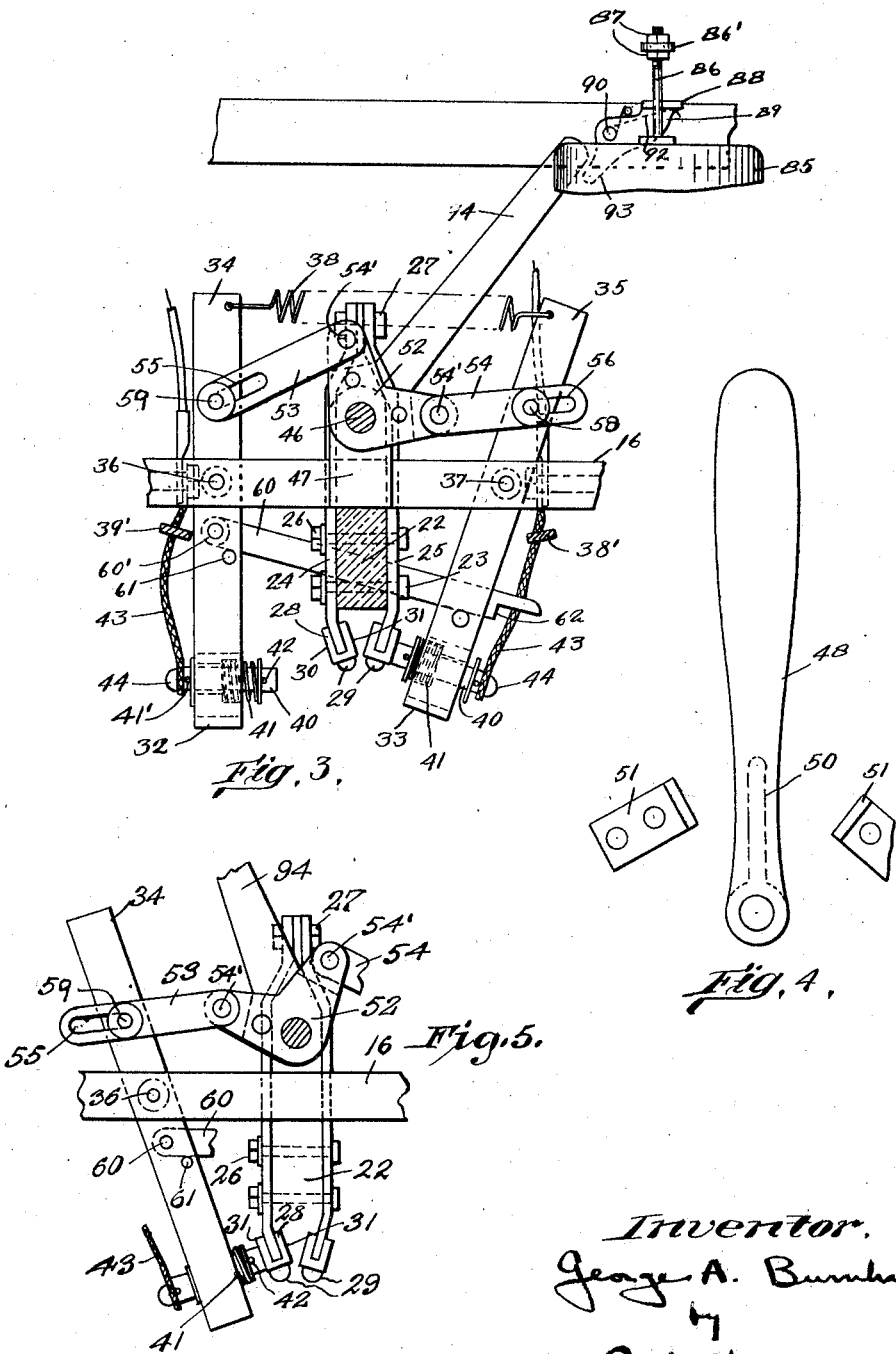

UNITED STATES PATENT OFFICE.

GEORGE A. BURNHAM, OF SAUGUS, MASSACHUSETTS, ASSIGNOR TO SEARS B. CONDIT, JR., OF BOSTON, MASSACHUSETTS.

ELECTRIC SWITCH.

1,390,493.   Specification of Letters Patent.   Patented Sept. 13, 1921.

Application filed November 6, 1917. Serial No. 200,618.

*To all whom it may concern:*

Be it known that I, GEORGE A. BURNHAM, a citizen of the United States, and a resident of Saugus, county of Essex, and State of Massachusetts, have invented an Improvement in Electric Switches, of which the following is a specification.

My invention relates to electric switches designed for the control and protection of electric motors, with especial reference to the control and protection of alternating current motors.

It is well known that an alternating current motor requires a much greater current at the instant of starting than it does when running at normal full load speed, and it is customary to provide a transformer and a double throw switch for the control of such a motor, the movement of the switch into one position connecting the motor to the line through the transformer which provides for the increased current flow required at starting, and after the motor has reached approximately normal speed, throwing the switch to its other position, which connects the motor directly to the line for normal operation.

It is highly desirable in such a switch that means be provided whereby it is impossible that both sets of switch contacts be connected to the motor or the line at the same instant for damage to the motor or line might thereby result.

Consequently it is an object of my invention to provide a double throw switch for the control of an alternating current motor in which two independent switch members are arranged each independently movable from a neutral, open-circuit position to a closed position, one of which switches is adapted to control the starting of the motor and the other of which is adapted to control the running of the motor and which are selectively operated by a single operating handle and to so arrange the switch members that both of said members cannot be in closed position at the same time.

If the switch were thrown directly to the running position, thereby connecting the motor directly to the line, without first causing the motor to be set in rotation by a movement of the switch into the starting position, the resulting rush of current through the motor would cause serious disturbances in the circuit to which the motor was connected.

A second object of my invention, therefore, is to provide the switch with means whereby it is normally impossible to move the switch from neutral into running position without previously moving the switch into starting position.

The means I employ to accomplish this object of my invention is in the provision of a latch, pivotally arranged on the starting switch member and normally engaging a component part of the running switch member to thereby restrain it against movement into closed position. Upon the movement of the starting switch member to closed position, the latch is raised from engagement with the running switch member and if the returning movement of the starting switch to open position and the subsequent movement of the running switch to closed position be made with sufficient rapidity, the running switch member is moved into closed position before the latch has fallen sufficiently to engage said switch member to thereby restrain it from movement into closed position.

When the contacts of a switch are separated, with a current flowing between them, an arc is formed which burns and corrodes the contacts and, if allowed to persist, soon destroys them. An arc also forms upon the closing of the switch. If the arc is allowed to exist for an appreciable length of time, as may be the case, in a slow movement of the contacts into engaged or disengaged position, the consequent erosion of the contacts serves, in a comparatively short time, to destroy the contacts and render the switch unreliable in operation.

A further object of my invention is the provision of means constraining the operator to move the switch members rapidly into open or closed position and thereby preventing the occurrence of arcs of long duration.

The means I employ to accomplish this object of my invention is the latch provided for the purpose of predetermining the order of operation of the switch, the rapid movement of the switch members into closed or open position made necessary for the proper predetermined order of operation also serving to cause the rapid engagement or disengagement of the switch contacts.

Another object of my invention is to so arrange the switch members and operating handle of the switch that the handle must be manually maintained in the starting position of the switch to maintain the starting switch members in closed position and upon release of the handle is reset to neutral position but is adapted to be maintained in set position in the running position of the switch and of a movement to neutral position by a movement of the operating handle toward neutral position.

The means I employ to accomplish this object is the provision of a toggle member associated with the operating handle and running switch member which is adapted to be straightened to maintain the switch in closed position and to be broken by a move of the operating mechanism toward neutral position to permit the return of the running switch to neutral position.

I provide the switch with overload coils arranged in the motor circuit and so adjust the coils that they will operate to open the switch and cause the return of its members to neutral position when the current flow in the motor circuit is at some value above a normal full load current. Inasmuch as the starting current is from five to six times the full load current, the overload coils will normally operate to trip the switch upon the starting current flow.

Although the switch is so constructed that it is not locked in starting position and therefore the operation of the overload coils to trip the switch is ineffective, yet upon the starting current flow, the movable elements of the coils are drawn within the coils and operate the tripping device. The switch, due to its construction, must be rapidly moved from starting to running position and this movement is so fast that the movable elements of the overload coils are yet within the coils when the switch reaches the running position. Consequently the normal runing current thereupon flowing through the coils, is sufficient to maintain the movable elements of the coils in elevated, and tripping position and so prevents the restraint of the switch in closed position.

Consequently an object of my invention is to provide means associated with the switch whereby the overload coils are restrained from operation upon the excessive current flow occasioned by a movement of the switch to starting position but, upon a movement of the switch to runing position the restraint against operation of the overload coils is removed whereby the coils are permitted to effectively respond to a predetermined excess current flow in the motor circuit to return the switch to neutral position and thereby open the motor circuit.

The means I employ to accomplish this object of my invention is the provision of an arm, associated with the running switch member, which, in the neutral position of the said member, serves as a stop to prevent the movable member of the overload current coils from operating to trip the switch but which, in the closed position of the running switch member is removed from the path of motion of the trip coil member which is thereby free to operate.

When the switch is moved to the starting position, a heavy rush of current flows through the motor, as has been heretofore stated. This excessive current flow, which is from five to six times normal value, at the instant of starting drops with increasing motor speed, until its value is substantially equal to the normal running value, and the motor speed is approximately normal full load speed, at which point the switch is thrown from the starting to the running position. Although the switch is rapidly moved into running position and the current flow through the motor is interrupted for but an instant, yet during that instant the speed of the motor drops sufficiently, so that, when the running contact is made, a secondary excess current flow occurs in the motor current. This secondary current flow may have a value of about twice normal current flow and may exist from 2 to 8 sec. If the overload current coils are arranged to operate instantaneously upon an overload, they will operate to trip the switch upon this secondary and harmless current flow and will prevent the successful movement of the switch into running position.

If the usual type of limit device is employed to delay the action of the overload coils and the device is also arranged to permit the starting of the motor without operating to trip the switch, as is customary, then the overload coils will be ineffective in fully protecting the motor against a continued overload of a value in moderate excess of full load, as is well known. If, however, the overload coils are associated with a time limit device having a short time element, then the action of the trip coils is delayed sufficiently to permit the occurrences of the secondary rush of current without operating to open the switch and, at the same time, provides for adequate protection to the motor against normal as well as abnormal overloads.

A further object of my invention is therefore, to associate with the overload coils of the switch, a time limit device having such a range of operation that it will be effective in delaying the operation of the overload coils upon the occurrences of the secondary rush of current and yet provide adequate protection to the motor against abnormal current values.

The means I employ to accomplish this object of my invention is the association of a disk of suitable dimensions with the movable element of the overload coils, which disk is immersed in a large body of oil, and which offers sufficient resistance to motion of said disk to accomplish the object desired.

A further object of my invention is to combine the starting transformer or compensator and switch in a single housing whereby a neat and compact arrangement of parts results.

Many of the features disclosed but not claimed in this application are disclosed and claimed in my Patent No. 1,318,131, dated October 7, 1919, and my co-pending application Serial No. 169,227 filed May 17, 1917, and application Serial No. 194,974 filed October 5, 1917.

In the figures:

Fig. 2 is a side elevation, partly in section, of the switch of Fig. 1.

Fig. 3 is a detail of the switch operating and tripping mechanism with the running switch restrained in closed position.

Fig. 4 is a detail of the operating handle and limit stops.

Fig. 5 is a detail similar to Fig. 3 but with the starting switch in closed position.

Figure 1:
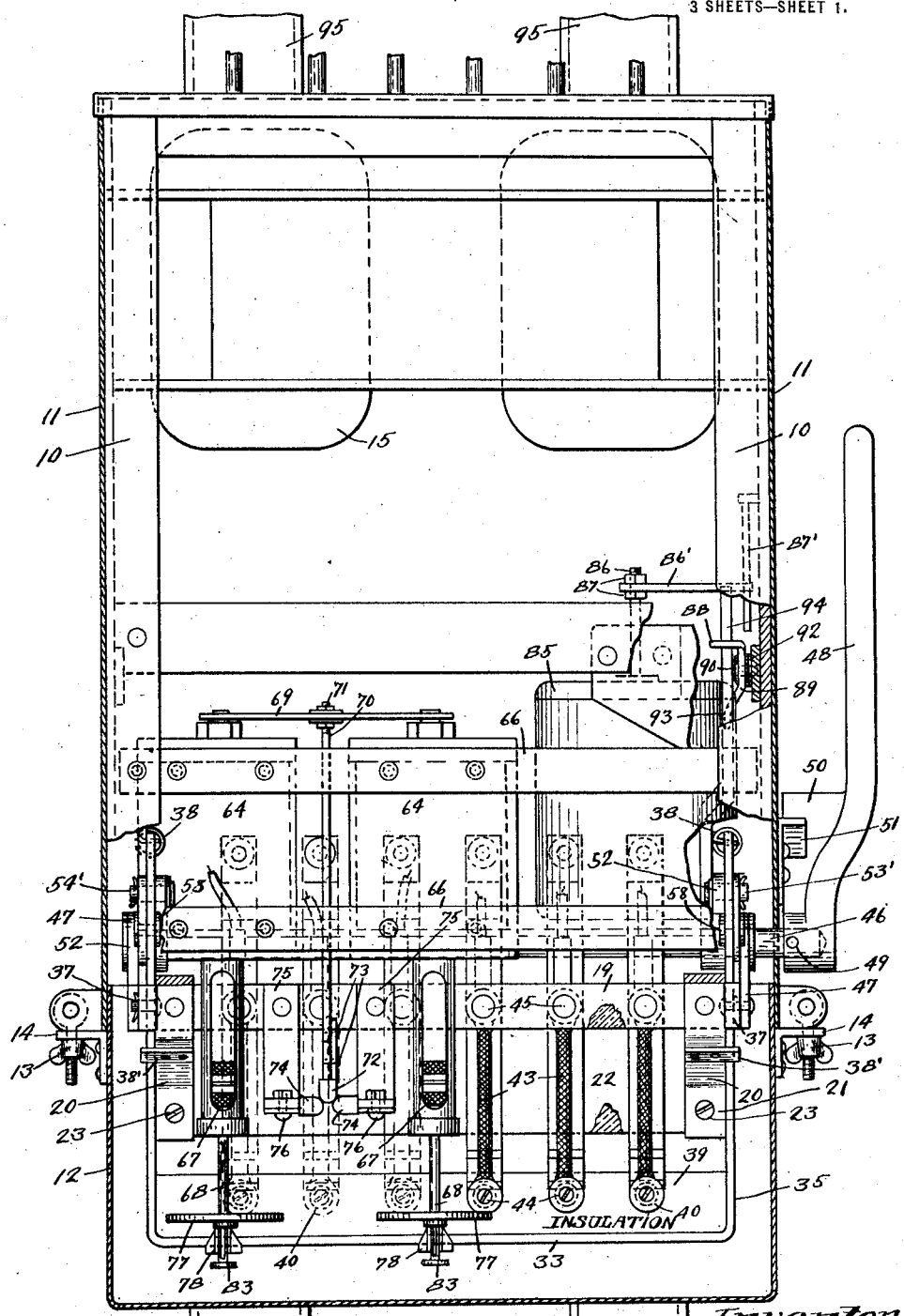
Figure 1 is a front elevation, partly in section, of a switch incorporating the object of my invention.

As here shown, the switch mechanism and associated apparatus is inclosed within the casing or housing formed by the frame structure constructed of angle irons 10 and cover plates 11. Said cover plates are secured to the frame structure by suitable means and forms the side and top walls thereof. An oil tank or receptacle 12 is disposed at the bottom of the casing and is detachably secured thereto by means of wing nuts 13 fastened to the side walls of the casing which are adapted to engage slotted angle members 14 fastened to the oil tank. Said tank is adapted to retain a sufficient amount of oil to immerse the switch contacts and other mechanism arranged in the lower part of the switch housing.

A transformer or compensator 15 is disposed in the upper part of said casing or housing and is secured therein, by suitable means, to the housing frame formed of said angle irons 10.

The switch mechanism is arranged in the lower part of said casing and is supported on a rectangular switch frame comprising steel end strips 16 which are formed with reflexed end portions 17 to which are secured, by means of bolts 18, the longitudinal members 19 formed of wood or other insulating material. Cross members 20 are disposed at the ends of said switch frame, being secured thereto by means of the bolts 18, and extend outwardly from said frame. The outwardly extended ends thereof are secured to the lower part of the housing frame and thereby serve to support the switch frame from the housing. Said cross members 20 are provided, intermediate the lengths thereof, with bent portions 21 so shaped as to form seats for the stationary switch contact carrier 22 which is secured in said seat portions of said cross members 20 by means of bolts 23. Said stationary contact carrier 22 is formed of wood or other insulating substance or material.

Pairs of contact strips 24 and 25 are secured to said insulating contact carrier 22 by means of bolts 26 and extend above said carrier and the upper ends thereof are bent into proximity with each other and are secured in said close relation by means of bolts 27. Said contact strips are disposed about the operating shaft to be hereinafter described but without making contact therewith. The lower ends of said contact strips extend below the contact carrier 22 and terminates in detachable contacts 28.

Said detachable contacts 28 are secured to said strips by means of screws 29 and are formed with two similar contact faces 30 and 31, but one of which faces is adapted to be in use at one time. When one surface of said contacts becomes burned to such an extent as to render the operation of the switch uncertain and unreliable the contact is reversed on its strip to position the heretofore unused contact face for engagement with a movable switch contact and thus prolong the life of said contact.

The ends of said contact strips 24 and 25 bearing the detachable contacts are inwardly bent a suitable amount to provide for proper engagement between the stationary and movable contact members.

The switch structure includes two independent switch members formed by steel strips so bent as to form flat contact-block carrying portions 32 and 33 and vertical arms 34 and 35 which are independently pivoted at 36 and 37 to the end strips 16 of the switch frame upon and opposite sides of the stationary contacts.

Said arms extend above the pivotal connection with the switch frame and retractile springs 38 are connected between said independent switch members to normally hold them in neutral or open position against the stops 38' secured to the cross members 20.

It is seen that by the arrangement shown, said springs tend to normally maintain both switch members in neutral position and the movement of one switch member into closed position serves to increase the tension upon said spring 38 and thereby increase the tendency of the unoperated switch member to remain in neutral position.

The switch member 34 may be considered the starting switch member and switch member 35 the running switch member.

Switch contact carrying blocks 39 formed of wood or other insulating material are secured to the flat sections 32 and 33 between the vertical arms 34 and 35 and a plurality of switch contacts comprising relatively short cylindrical rods 40 of suitable material are slidably arranged therein. Helical springs 41 encircle each rod and bear against pins 42 in the ends of said rods and the carrying blocks to provide a yielding engagement of said rods with the stationary switch members. Pins 42' in the other ends of said rods serve to prevent the escape of said rods from said carrying blocks under the pressure of said springs 41.

When the switch members are moved into closed position the contacts 40 are adapted to yieldingly engage the stationary contact members and each contact is thereby adapted to make contact with its stationary members independent of the contact engaging position of any other contact member. Said contacts 40 are, moreover, adapted to have a more or less loose sliding fit within said contact carrying blocks 39 whereby slight free movement of said contacts relative to said blocks is possible and the contacts are thereby adapted to take such a position as to engage the stationary contacts over the full area of their contact faces.

Flexible conducting leads 43 are secured, by means of screws 44 to the ends of said contact members 40 and the terminals are secured to the longitudinal insulating members 19 of the switch frame structure by means of bolts 45. Said longitudinal members thereby form terminal boards, or strips on which connections are adapted to be made from the compensator, line, and motor to the movable switch contacts. Connections to the stationary switch contacts are made with the contact strips 24 and 25 by means of bolts 26.

The switch operating mechanism includes the shaft 46 which extends the length of the switch structure and is supported in bearings in the plates 47 secured to the end strips 16 of the switch frame. Said operating shaft 46 extends through the casing or switch housing and a switch operating handle 48 is secured at said outer end thereof by means of the pin 49.

Said switch handle is normally adapted to assume a vertical position with both switch members in neutral position. The handle is formed with a web 50 on a portion thereof adjacent the switch housing and said web is adapted to engage one or the other of two stops 51 formed of steel strips bent at right angles and secured to said switch housing to limit the movement of said handle, and consequently the switch mechanism, in the starting and running position of the switch members.

The bell crank levers 52 are secured to said shaft in approximate alinement with the vertical arms 34 and 35 of the independent switch members and links 53 and 54, pivoted at 54' to the arms of said bell crank levers, serve to operably connect said levers to the switch members. Said links 53 and 54 are slotted at 55 and 56 and pins 59 and 58 secured to the vertical arms 34 and 35 of the switch members at some point thereon intermediate the ends and the pivotal connection thereof with the switch frame are arranged for slidable engagement therein.

Said bell crank levers and slotted links form means whereby each switch member may be operated independently of the other member and also form means preventing the simultaneous engagement of both of said switch members with the stationary contacts.

In the operation of the switch operating mechanism as described, the rotation of shaft 46 in such a direction as to straighten the toggle formed by an arm of bell crank lever 52 and link 53 for instance, serves to move the starting switch member 34 away from contact with its stop 38' and into engaging position with the stationary contacts.

In such a movement of the operating shaft 46 the link 54 connected between the bell crank lever 52 and the running switch member 35 is merely moved relative to the pin 59 carried by said switch member, because of the slot in said link, without operatively engaging said switch member. Upon a reverse movement of said operating shaft 46, the retractile spring 38 serves to move said switch member 34 from closed to neutral position, following the movement of links 53 in its movement to neutral position. If said switch member 34 should remain in contact engaging position after a movement of the operating mechanism toward neutral position because of a partial welding together of the switch contacts or otherwise, said operating mechanism is so designed that subsequent to a certain small independent movement of said operating mechanism relative to said switch member 34, the link 53 is moved sufficiently to enable the outer end of the slot 55 therein to engage the pin 58 secured to said switch member, whereupon a further movement of said operating mechanism acts to forcibly move said switch member from closed position toward neutral, or open position, said operating mechanism is so designed that, in the event of one switch member remaining in closed position upon a movement of said mechanism to move said member to neutral position and to move said other previously unoperated member into closed position, said mechanism will forcibly move said first operated member from closed position before it moves sufficiently to move the second switch member into closed position.

The toggle formed by an arm of the bell crank lever and the link 53 connecting the starting switch member 34 is such that it is ineffective in maintaining the said switch member in closed position (see Fig. 5) and therefore the operating handle must be maintained by the operator in the starting position to maintain said switch member in closed position and when said handle is released said switch member and operating mechanism is returned to neutral position by means of the retractile spring 38 connected with said switch members.

The toggle formed between the remaining arm of the bell crank lever 52 and the link 54 is, however, designed to be such that, upon a movement of the running switch member 35 into closed position the toggle will restrain said member and operating mechanism in said closed position (see Fig. 3) until said toggle is broken by the manual movement of the switch handle and mechanism into neutral position or by the current protective means to be hereinafter described.

The means whereby the switch must be moved into starting position before it can be moved into running position and the means constraining the switch members to be rapidly moved into contact engaged and disengaged positions includes the lever or latch 60 pivoted at 60′ to the vertical arm 34 of the starting switch member. A pin 61 secured in said arm serves to restrain the said lever against movement below a predetermined position.

Said lever or latch 60 extends into proximity with the running switch members 35 and the end thereof is provided with a notched portion including an abutment 62. A pin 63 is secured in the vertical arm 35 of the running switch member and in the normal neutral position of the switch, the notched end portion of said lever or latch 60 is adapted to rest upon said pin.

It is seen that a movement of the running switch member 35 toward closed position causes the pin 63 carried by said member to move into engagement with the abutment 62 of said latch 60 and said member is thereby restrained against movement into closed position.

The starting switch member is, however, free to move into closed position; such movement raising the notched end portion of the latch 60 sufficiently to enable said latch to clear the pin 63 on the running switch member. If the switch mechanism be now moved from starting to running position, and such movement takes place with sufficient rapidity, the starting switch member can be moved into open position and the running switch member moved into closed position before the latch 60 has fallen sufficiently to enable the notched end portion thereof to effectively engage the pin 63 of said running switch member. Upon a movement of the switch mechanism slower than the predetermined speed, said latch will be effective to engage and restrain the running switch member from movement into running position.

Overload trip coils are provided and are connected in the motor circuit to cause the opening of the switch upon a predetermined excess current flow. Two such coils are shown and comprise the coils 64 secured between the arms of supporting members 65, which members serve the double purpose of providing a flux path between the ends of said coils and as a means for supporting said coils from the cross strips 66 secured between two angle members 10 of the housing frame.

Said trip coils are of customary construction and are provided with means 67 whereby the coils may be adjusted. Each coil is provided with a rod 68 extended through said coils and secured to the movable members thereof. The ends of the two rods 68 extending through the top of said coils are attached to a flexible bar or strip 69. A depending rod 70 is attached, by means of nuts 71, to a suitable point on said bar or strip intermediate the length thereof and said rod 70 terminates in a separable contact member 72 detachably secured thereto by means of screws 73.

Said contact member 72 is adapted to movably engage contacts 74 and complete an electric current therebetween to a no-voltage or under voltage release coil to be hereinafter described. Said contacts 74 are detachably secured by means of bolts 76 to conducting strips 75 attached to one of the longitudinal insulating members 19 forming a terminal board or strip and connection is adapted to be made between said strips and the no-voltage release.

The no-voltage coil is arranged to trip the switch upon a cessation of motor energization or upon a predetermined under energization thereof.

Upon a current flow, in excess of a predetermined amount in both overload or trip coils it is evident that the movable members thereof will be drawn within said coils and thereby raise the attached rods 68 and elevate the movable contact 72 carried by the strip 69 to which said rods are attached, away from engagement with said stationary contacts 72, said disengagement of the contact members serves to break the current including the no-voltage coil and to cause said coil to operate to trip the switch and cause its movement thereof from running into neutral position.

An excess energization of one trip coil alone serves to raise its corresponding rod 68 to flex and raise the attached strip 69 and thereby separate the contacts 72 and 74 to break the no-voltage release coil circuit and thereby cause the tripping of the switch by means hereinafter to be explained.

Rods 68 extend into the oil in the tank 12 below the trip coils 64 and are provided with disks 77 secured thereto.

Said disks 77 function as time limit devices and in a movement of the movable element of the trip coils, due to an excess current flow, the resistance offered by the oil to such movement of the disks 77 is sufficient to delay the operation of the trip coils over such a time interval as to permit the movement of the switch from starting into running position, with the consequent secondary rush of current, without causing the tripping of the switch.

The time interval or delay provided for by the disks 77 is designed to be insufficient to prevent the operation of the trip coils under the large starting current and therefore means are provided for normally restraining the coils against operation, which restraint is adapted to be removed when the switch is in running position.

For this purpose arms 78 are secured to the portion 33 of the running switch member and extend in proximity to the rods 68 attached to the movable members of the trip coils. Said arms are provided with dogs or latches 79 pivoted at 80 to said arms and normally maintained against stops 81 on said arms by the springs 82. The toe portions of said dogs 79, in the neutral position of the running switch member are disposed in the path of movement of the enlarged ends 83 of said rods 68 and above said ends and serve to normally restrain said rods, by engagement with said enlarged ends, from movement to cause the tripping of the switch. When, however, the running switch member is moved into closed position, the arms 78 and dogs 79 are moved from proximity with said rods 68 and said rods are thereby free to move upward, upon excess current flow, to operate to trip the switch.

Upon the tripping of the switch by said over load coils, the running switch may move to open position before the movable members of said coils have dropped to normal position. In such event, the ends 83 of the rods 68 of said coils engage and move aside the dogs 79 and after the ends of said rods have moved below said dogs, they snap back into trip coil locking position and restrain said coils from operation as long as the running switch remains in open position.

The no-voltage release, which controls the tripping of the switch upon an insufficient motor energization and which is controlled by the overload coils to cause the tripping or opening of the switch upon an excess current flow, comprises the coil 85 secured to the cross strips 66 which also support the over load coils 64. Said coil is of usual construction and includes a removable core piece or member, not shown, to which the rod 86 is secured. Said rod is provided with a threaded end portion upon which the nuts 87 are adjustably secured. The adjustment of said nuts along said rod 86 serves to determine the under voltage at which the coil may operate to trip the switch and also serves to adjust the amount of energy developed by the fall of the core piece which is available in moving the switch mechanism to break the locking toggle and thereby release the switch from running position.

The rod 86 has a striking strip 86' secured thereto by the nuts 87 and projects over the arm 88 of a lever 89 pivoted at 90 to the frame of the switch housing and forms means whereby the movement of the movable element of the under voltage release coil is transmitted to the tripping lever 89. Said striking strip is arranged to slidably engage a guide pin 87' secured to the switch housing whereby said strip is maintained in position above the arm 88 of the tripping lever 89.

Said lever 89 is normally maintained against a pin 91 secured in said housing frame by means of the coiled spring 92. The lever is formed with the end portion 93 adapted, upon a movement of said lever to cause the tripping of the switch to engage an arm 94 secured to the operating shaft 46.

In the neutral or starting position of the switch, the arm 94 is in other than engaging position with said lever 89 but upon a movement of the switch into running position said arm 94 is moved into proximity with said lever 89 and said switch is maintained in running position by the toggle formed between the bell crank lever 52 and link 54.

With a motor energization in excess of a predetermined value, the movable member of the no-voltage release coil 85 is raised into elevated position and consequently raises the nuts 87 attached to rod 86 from engagement with the arm 88 of said lever 89. When the energization of said coil is insufficient or has entirely ceased, the movable member thereof falls by gravity and causes the striking strip 86' to strike a blow to the lever 89. The force of said blow is transmitted, through said lever, to the arm 94 secured to the switch operating shaft 46, and causes said shaft to be rotated an amount sufficient to break the toggle formed between the bell crank lever 52 and links 54 connected to the running switch member and thereby permit the spring 38 to be effective in moving the switch members and operating mechanism into neutral position.

The switch housing is secured to two vertical channel members 95 by means of which said switch may be secured to any suitable support.

I claim:—

1. In a starting device for electric motors two movable switch members each comprising a U-shaped frame having its arms pivotally supported, an insulating block carried by it and contact-members carried by said block, stationary switch-members disposed between said frames, an operating shaft, and toggle-mechanism connecting said shaft with said frames.

2. In a starting device for electric motors, a rectangular frame structure having end-members, and side members, two movable switch-members having U-shaped, contact-supporting frames disposed within and depending below said frame having their arms pivoted to the end-members of said frame, an insulating bar supported by said frame between said movable switch-members, and stationary switch members carried by said bar depending below said frame between said movable switch members.

3. In a starting device for electric motors, a rectangular frame structure having end-members, and side members comprising bars of insulating material, two movable switch-members having U-shaped, contact-supporting frames disposed within and depending below said frame, switch-members having arms pivoted to the end-members of said frames and extended thereabove, operating mechanism carried by said frame and connected with said extended ends of said arms, insulated bars carried by said movable switch members and contact-members carried by said bars, circuit-terminals carried by the insulating side bars of said frame, flexible leads extended from said terminals to said contact-members of the movable switch members, an insulated bar carried by said frame between said movable switch-members, and stationary switch-members carried by said bar.

4. A starting device for electric motors comprising a supporting frame, an insulating bar carried by said frame, two sets of electrically connected stationary switch-members carried by said bar, two movable switch-members pivotally supported by and depending from said frame on opposite sides of said stationary switch-members, and operating mechanism arranged independently to actuate said movable switch members to move them into contact with the coöperating set of stationary switch-members.

In testimony whereof, I have signed my name to this specification in the presence of two subscribing witnesses.

GEORGE A. BURNHAM.

Witnesses:
T. T. GREENWOOD,
H. B. DAVIS.